Figure 2:
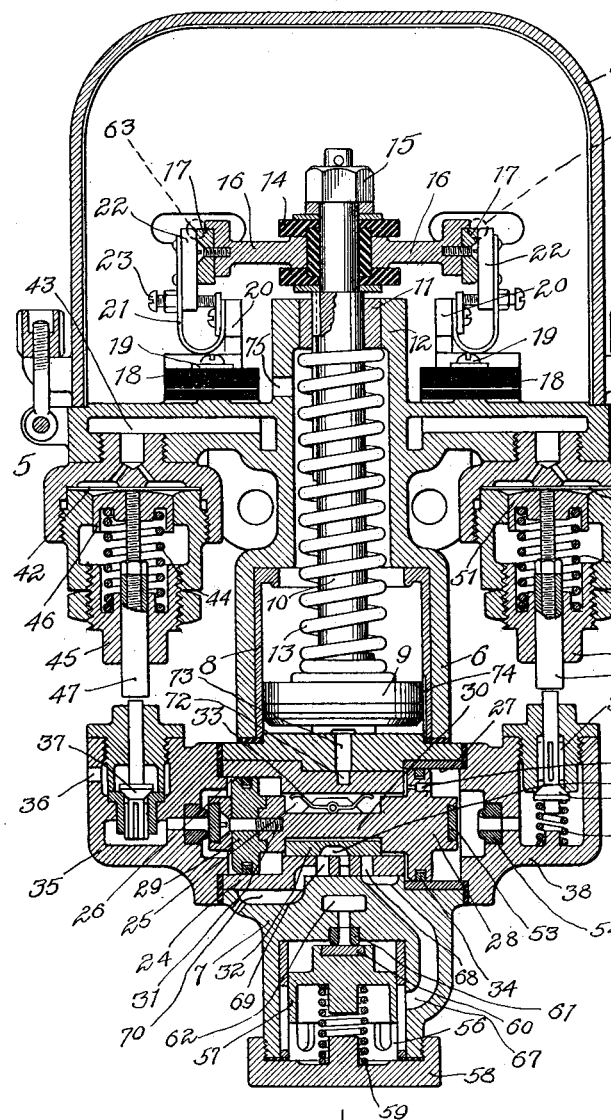

B. S. AIKMAN.
PNEUMATIC GOVERNOR.
APPLICATION FILED JULY 31, 1911.
1,078,595.
Patented Nov. 11, 1913.
2 SHEETS—SHEET 1.
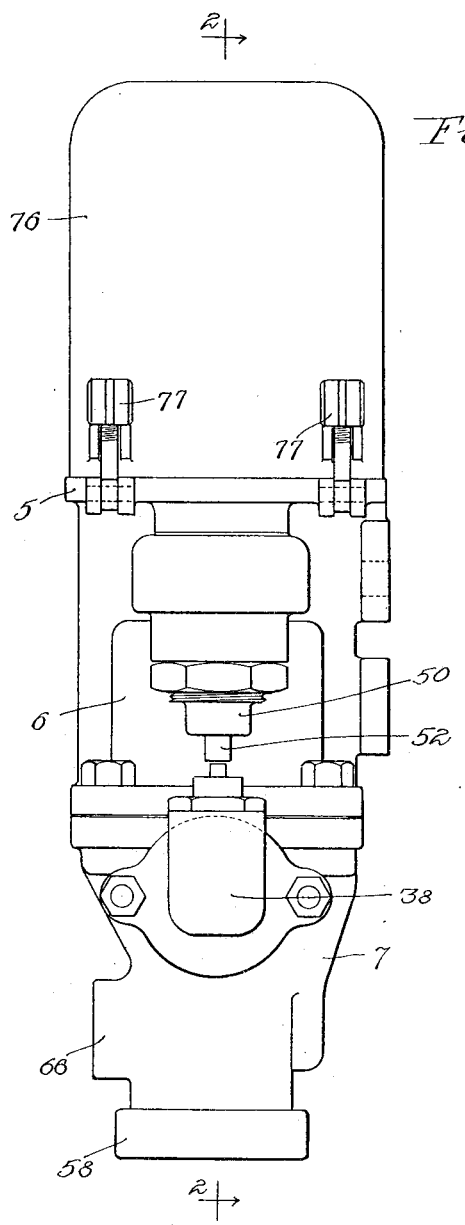
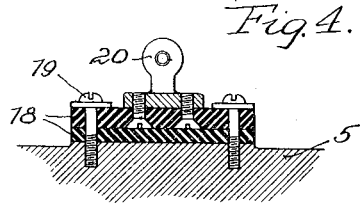
WITNESSES:
Robert F. Bracke
Arthur H. Brettcher
INVENTOR:
BURTON S. AIKMAN
BY
ATTORNEYS

B. S. AIKMAN.
PNEUMATIC GOVERNOR.
APPLICATION FILED JULY 31, 1911.

1,078,595.

Patented Nov. 11, 1913.
2 SHEETS—SHEET 2.

WITNESSES:
Robert F. Bracke
Arthur H. Boettcher

INVENTOR:
BURTON S. AIKMAN
BY Brown Williams
ATTORNEYS

COLUMBIA PLANOGRAPH CO., WASHINGTON, D. C.

UNITED STATES PATENT OFFICE.

BURTON S. AIKMAN, OF CHICAGO, ILLINOIS, ASSIGNOR TO NATIONAL BRAKE & ELECTRIC COMPANY, OF MILWAUKEE, WISCONSIN, A CORPORATION OF WISCONSIN.

PNEUMATIC GOVERNOR.

1,078,595.     Specification of Letters Patent.     Patented Nov. 11, 1913.

Application filed July 31, 1911. Serial No. 641,603.

*To all whom it may concern:*

Be it known that I, BURTON S. AIKMAN, a citizen of the United States, residing at Chicago, in the county of Cook and State of Illinois, have invented certain new and useful Improvements in Pneumatic Governors, of which the following is a full, clear, concise, and exact description, reference being had to the accompanying drawings, forming a part of this specification.

My invention relates to controlling devices, more particularly pneumatic governors, such as are employed in connection with air compressing mechanism to control the starting and stopping of the device for operating the air-compressing mechanism, so that a substantially constant pressure may be maintained. In systems of this kind, compressed air is employed as an operating fluid, and, while there are frequent withdrawals from the supply of the compressed air, it is necessary that there be a substantially and practically constant pressure at all times. In the present day, these arrangements are employed very considerably in electric railway systems, particularly for the purpose of operating the brake equipments. A motor compressor is connected with a supply tank to maintain therein a constant supply of compressed air at the required pressure, this tank being connected with the brake cylinders through a valve, and the motor being controlled to start and stop in acordance with certain variations in pressure.

The subject matter of my invention is a governing unit, which comprises essentially a switch and means for closing this switch when the pressure in the supply tank has been reduced to a minimum, and opening it when the pressure has again reached a predetermined maximum. This switch is either directly in the circuit of the motor for operating the compressor, or in a local control circuit, automatic means being usually provided for placing the load upon the motor gradually, rather than suddenly. The particular nature of the connection between the controlling unit and the motor does not concern this invention, and I shall make no specific reference thereto. In fact, the entire invention herein is confined to a governor *per se*, and this description will be so confined, except as it is necessary to refer to the other parts so that the controlling unit itself may be properly understood.

It is the primary object of my invention to provide improved "blow-out" means for acting upon the circuit contacts as they are separated, so as to reduce and possibly entirely eliminate any arc that might occur.

I am aware that, broadly, the idea of utilizing a draft of air to blow out the arc upon the separation of the contacts is old, but I desire to point out that much difficulty has been encountered in the use of these prior devices. The main disadvantage in the prior structures was that the blow-out was limited. If an attempt was made to increase the blast available for blow-out purposes, that had to be done at a sacrifice in the efficiency of operation of some other part of the mechanism. It is essential, as before implied, to have the contact make and break mechanism operate quickly, and this is impossible, in a pneumatic machine, unless a very substantial thrust of air is utilized for operating purposes. If, in the prior art devices, too much of a demand is made upon this supply of air, for blow-out purposes, the action of the piston is correspondingly weakened.

It is the object of my invention to overcome this difficulty, and I do this by driving the air blast directly from the main reservoir or source of supply, where the pressure is a high one, and where, whatever the pressure may be, its whole force is available for the air blast for blow-out purposes. And I provide unique means for securing the control, one of the important features being that the blow-out nozzle is fed before the separation of the contacts takes place.

It is a further advantage that the regulation of the blow-out blast is independent of the regulation of the operating means,—in other words, adjustment may be made independently, although there is a certain controlling relation between the valves which are provided. In this way it is possible to regulate the air blast as to its strength and duration without in any way diminishing or changing the effectiveness of the operation of the actuating means.

Other features of advantage will become apparent to those skilled in this art as this description proceeds, and I have made them the subject matter of some of the more limited of the appended claims.

My invention is embodied in the device illustrated in the accompanying drawings, in which,—

Figure 3:
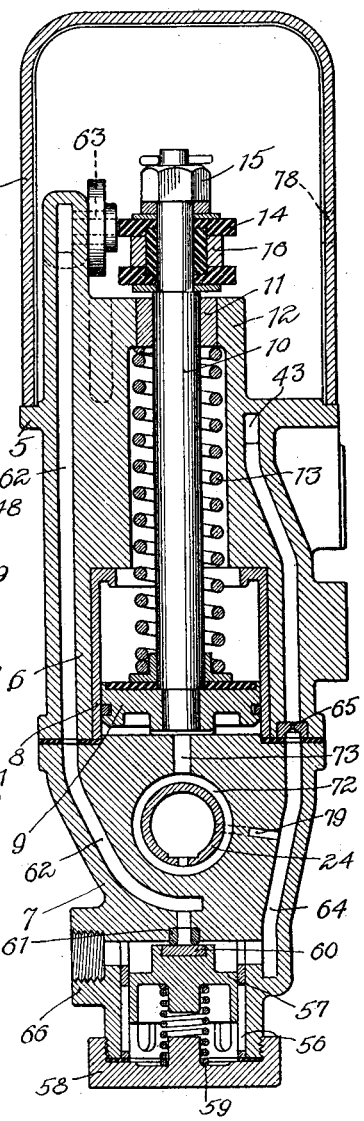

Figure 1 is a side elevational view thereof; Fig. 2 is a sectional view taken on the plane of the line 2—2 of Fig. 1 and looking in the direction indicated by the arrows; Fig. 3 is a sectional view taken upon the plane of the line 3—3 of Fig. 2 and looking in the direction indicated by the arrows; and Fig. 4 is a detail view of the contact mechanism.

Like reference characters are applied to the same parts throughout the various figures.

The body of the device consists of a shelf 5 which has a central, downwardly extending portion providing for an operating cylinder 6. To the under side of this cylinder 6 a casting 7, which forms a valve casing, is secured in some suitable manner. The cylinder 6 is provided with an internal bushing 8, and a piston 9 is mounted to operate within this bushing. The piston 9 has the upwardly extending stem 10, which is mounted to slide in a bushing 11 secured in a boss 12 carried upon the shelf 5. A coiled spring 13 surrounds the stem 10 and is disposed between the bushing 11 and the piston 9 in order that it may tend to keep the piston down in its lowered position, the position shown in Figs. 2 and 3. The stem 10 extends upwardly beyond the bushing 11, and it is there provided with an insulating spool 14 clamped in place by means of a nut 15. A yoke 16, of metal, is mounted upon this insulating spool, and at each end it is provided with a contact block 17.

On each side of the shelf 5 there is provided an insulating block 18, shown in detail in Fig. 4, held in place by means of screws 19, 19. Each of these insulating blocks carries a bracket 20, to which a spring 21 is secured. This spring is U-shaped, and upon its free end it carries a contact block 22 for sliding engagement with the corresponding block 17. An adjusting screw 23 provides for the proper positioning of the block 22. It will now be seen that when the piston 9 rises, the contact blocks 17, 17 will be carried away from the contact blocks 22. These contacts control the motor circuit which has been referred to, and the leads may be secured to the brackets or connected with the contacts in any other suitable way. The point is that when the piston rises the motor circuit is broken, in the manner described, and when the piston drops the motor circuit is completed.

The casting 7 has a transverse bore, in part of which a sleeve 24 is disposed. This sleeve provides a central bore 25 in the piston chamber 26. The other end of the central bore in the casting 7 is provided with a bushing 27, which also forms a piston chamber. A piston member is associated therewith, and this member comprises a piston 28, sliding in the piston chamber 27, and a piston 29 sliding in the piston chamber 26, these pistons being connected together by means of a rod 30, and the parts being all assembled by means of a screw 31. The piston member carries with it a sliding valve 32, this valve being provided with a spring member 33, wiping on the inside of the bore 25, to retard the action and to insure keeping the valve upon its seat. The pistons are provided with suitable piston rings 34, 34. A chamber on the free side of the piston 29 is formed by means of a casting 35 which has an outlet 36 to the atmosphere, this outlet being controlled by a valve 37, seating by air pressure and gravity. The chamber on the free side of the piston 28 is formed by a casting 38 which has an outlet 39 to the atmosphere, this outlet being controlled by a valve 40 normally seated by means of air pressure and a spring 41.

The low pressure element is associated with the valve 37. This low pressure element is in the form of a diaphragm 42, which is exposed to reservoir pressure through passageways 43, as will be pointed out more fully later. This diaphragm is opposed by a coiled spring 44 which is seated upon an adjusting nut 45. The diaphragm controls a plunger 46 which has a stem 47 which is adapted to bear down upon the top of the stem of the valve 37, as will be pointed out later.

The high pressure element is associated with the valve 40, this high pressure element consisting of a diaphragm 48 exposed to reservoir pressure through passageways 43, and this diaphragm being opposed by a coiled spring 49 mounted in an adjusting nut 50. The diaphragm 48 controls a plunger 51 which has a stem 52 adapted to bear down upon the stem of the valve 40, as is evident from the drawing.

Each of the pistons 28 and 29 carries a seat packing 53 which coöperates with a valve seat 4, and these parts form auxiliary valves for a purpose which will be pointed out presently. The piston 28 has a restricted by-pass 55, the function of which will be referred to.

The under side of the casting 7 is provided with a pocket in which a bushing 56 is disposed, and a valve 57 operates in this pocket. The pocket is closed by means of a cap 58, and a spring 59 is disposed between the cap and the piston to hold the latter in its upper position. When the piston is in its upper position, a seat packing 60 rests upon a seat 61 provided at the mouth of a channel 62 which leads upwardly to a pair of blow-out nozzles 63, 63 disposed, respectively, before the contacts 17—17, 22—22, at the points where they break. The chamber above the piston 57 is connected by means of a passageway 64 with the passageways 43, 43, through a restricted passageway 65, as shown in Fig. 3. The chamber above the piston 57 is connected with the reservoir by means of a coupling 66, so it will be seen that, under ordinary circumstances, the reservoir pressure reaches the diaphragms 42 and 48 through the restricted passageway 65. The bushing 56 is slotted so that the chamber below the piston 57 may be placed under the control of the sliding valve 32 by means of a passageway 67. The valve 24 is provided with a passageway 68 connecting with the passageway 67 and with a passageway 69, which, by means of a passageway 70, leads to the atmosphere. The valve 32 has a passageway 71 which is adapted to connect either the passageway 69 or the passageway 68 with the annular passage 72 in the sleeve 24, this passageway 72 connecting with the piston chamber by means of the passageway 73. A by-pass 74 forms a restricted connection between the chambers above and below the piston 9, when it is in its normal position, and the chamber above the piston is connected by means of an outlet 75 with the inside of the casing, which is free to the atmosphere.

A hood 76 is adapted to be clamped over the contact mechanism by means of clamping screws 77, 77, this hood being provided with outlets 78, 78, registering with the nozzle 63, 63.

It will be noted that the reservoir is always connected to the chamber confined between the two pistons 28 and 29, by means of a passageway 79. The presence of the by-pass 55 normally balances the piston member, thus assisting the spring 33, and preventing operation except by a positive blast.

Referring now particularly to Figs. 2 and 3, it will be seen that the various parts are in position for closing the motor circuit, and, the compresser thus operating, the pressure in the reservoir is being gradually built up. When the predetermined minimum pressure has been reached, the adjusting nut 45 being properly adjusted for the purpose, the action on the diaphragm 42 overcomes the spring 44, and the stem 47 engages the stem of the valve 37 to hold it down firmly upon its seat. This same pressure is applied to the valve 48, but the spring 49 is adjusted to a stronger tension, and is therefore not overcome. When the predetermined maximum pressure has been attained, the spring 49 will be overcome, the adjusting screw 50 being properly set for the purpose, and the stem 52 will come down upon the stem of the valve 40, overcoming the air pressure and the spring 41 and opening the corresponding chamber to the atmosphere. Since we have reservoir pressure between the pistons 28 and 29, and since the piston 28 is of considerably larger diameter than the piston 29, the pressure will move the valve over to the right (Fig. 2), and the passageways 68 and 72 will be joined by the passageway 71 in the valve. This operation takes place quickly, and immediately the pressure below the piston 57 is lowered, since that chamber is connected through the passageway 67, passageway 68, passageway 71, passageway 72, passageway 73, by-pass 74 and outlet 75, with the atmosphere. Since we have reservoir pressure above the piston 57, the piston will drop slightly and the reservoir pressure will immediately rush up through the passageway 62 and out of the blow-out nozzles. It is noted that this takes place before the passageway 67 is connected with reservoir pressure, and thus we have the blow-out effect upon the contacts before they are actually separated. When the piston 57 comes down far enough, however, the reservoir pressure passes through the order of passageways just described, as far as the piston chamber. Since it is a very considerable blast of air, the by-pass 74 has no effect and the piston 9 is thrown up suddenly, and when there it seats itself against the inwardly turned flange of the bushing 8. Thus the circuit is broken when the maximum pressure is reached; and since the piston 9 seats itself to close any connection, however slight, between the chamber below the valve 57 and the atmosphere, the valve 57 will rise, after equalization on both sides of it, to close the passageway to the blow-out nozzles. Until the passageway 62 is closed, however, the blow-out nozzles are fed directly from the reservoir, and thus the blow-out is effective during all the time when arcing might take place.

As the air is gradually withdrawn from the reservoir and as the pressure is gradually lowered, the diaphragm 48 is overcome by the spring 49, and the spring 41 may operate to absolutely close the valve 40. When, however, the minimum pressure is reached, the spring 44 overcomes the effect on the diaphragm 42, and the valve 37 may rise to open that side of the piston 29 to the atmosphere. This gives the reservoir pressure between the two pistons an opportunity to throw the piston member over toward the left (Fig. 2), and the chamber below the valve 9 is connected through the passageway 73, passageway 72, passageway 71, passageway 69 and passageway 70, to the atmosphere. Immediately the piston 9 drops and throws the contacts into engagement again—and the cycle of operations described may be repeated. It will be noted that in whichever position the piston member is found, the parts 53 and 54 assist the valve 37 or 40 in its action, whichever the case may be.

I claim as new and desire to secure by Letters Patent:

1. In a pneumatic governor, a pair of contacts, means for separating said contacts, an air inlet, a blow jet before said contacts, and a valve controlling said inlet for first admitting air to said blow jet and then to said separating means.

2. In a pneumatic governor, a pair of contacts, pneumatically operated means for operating said contacts, a valve alternately operated upon high and low pressure, an air inlet, a blow jet before said contacts, and a second valve controlled by the action of the first named valve for admitting air to said blow jet and then to said pneumatically operated means.

3. In a pneumatic governor, a pair of contacts, pneumatically operated means for operating said contacts, a valve, a high pressure element and a low pressure element controlling the movement of said valve, an air inlet, a blow jet before said contacts, and a second valve initially controlled by said first named valve, for admitting air to said blow out jet and then to said pneumatically operated means.

4. In a pneumatic governor, a pair of contacts, pneumatically operated means for operating said contacts, a valve, an air passage controlled by said valve, a high pressure element and a low pressure element controlling the movement of said valve, an air inlet for said air passage, a nozzle before said contacts, and a second valve initially controlled by the action of said first named valve, for connecting the air inlet first with said nozzle and then with said air passage.

5. In a pneumatic governor, a pair of contacts, an operating piston for operating said contacts, an air inlet to the piston chamber, an atmosphere connection for the piston chamber, a piston member comprising two connected pistons one larger than the other, means for the admission of air between said pistons, a valve controlling the chamber on the forward side of each piston subject to pneumatic pressure for controlling said valves, said piston member carrying a valve for connecting the main piston chamber with either the air passage or the atmosphere connection.

6. In a pneumatic governor, a main piston chamber, a piston operating in said chamber, an air passage leading to said chamber, an atmosphere connection for said chamber, an air inlet, a valve controlling the connection between said air inlet and said air passage, an automatically operated valve for connecting the piston chamber with either said air passage or said atmosphere connection, contacts operated by said piston, and a nozzle before said contacts, said nozzle being adapted to be connected to said air inlet but being controlled by said first named valve.

7. In a pneumatic governor, a pair of contacts, pneumatically operated means for operating said contacts, a valve alternately operated by a high and low pressure element, an air inlet, a blow jet before said contacts, a second valve controlled by the action of the first named valve for admitting air into said blow jet and then to said pneumatically operated means, and means for maintaining said second valve in position to close the passage to the nozzle into the pneumatically operated means.

In witness whereof, I hereunto subscribe my name this 27th day of July, A. D. 1911.

BURTON S. AIKMAN.

Witnesses:
ARTHUR H. BOETTCHER,
R. H. WEILAND.

Copies of this patent may be obtained for five cents each, by addressing the "Commissioner of Patents, Washington, D. C."